United States Patent
Zhang et al.

(10) Patent No.: US 12,309,700 B2
(45) Date of Patent: May 20, 2025

(54) SYSTEMS AND METHODS FOR CONNECTED MODE DISCONTINUOUS RECEPTION ON/OFF DETERMINATIONS

(71) Applicant: APPLE INC., Cupertino, CA (US)

(72) Inventors: Lijie Zhang, Beijing (CN); Lele Cui, Beijing (CN); Xiaolong Tu, Beijing (CN); Dongzhou Yang, Beijing (CN); Tao Tao, San Jose, CA (US); Lei Zhou, Beijing (CN); Zihuan Xu, Beijing (CN)

(73) Assignee: APPLE INC., Cupertino, CA (US)

( * ) Notice: Subject to any disclaimer, the term of this patent is extended or adjusted under 35 U.S.C. 154(b) by 293 days.

(21) Appl. No.: 17/933,923

(22) Filed: Sep. 21, 2022

(65) Prior Publication Data

US 2024/0098639 A1    Mar. 21, 2024

(51) Int. Cl.
*H04W 52/02* (2009.01)
*H04L 1/00* (2006.01)
*H04W 76/28* (2018.01)

(52) U.S. Cl.
CPC ....... *H04W 52/0232* (2013.01); *H04L 1/0061* (2013.01); *H04W 76/28* (2018.02)

(58) Field of Classification Search
CPC ......... H04W 52/0216; H04W 52/0229; H04W 52/0232; H04W 76/28; Y02D 30/70
See application file for complete search history.

(56) References Cited

U.S. PATENT DOCUMENTS

| | | | | |
|---|---|---|---|---|
| 10,855,841 B1 * | 12/2020 | Agrawal | ............... | H04M 3/487 |
| 2020/0367301 A1 | 11/2020 | Kim et al. | | |
| 2023/0217304 A1 | 7/2023 | Singh et al. | | |
| 2023/0371118 A1 * | 11/2023 | Kuang | ............... | H04W 52/0219 |
| 2023/0388929 A1 * | 11/2023 | Barbu | .................. | H04W 76/20 |
| 2024/0244524 A1 * | 7/2024 | Bala | .................. | H04W 52/0245 |
| 2024/0349187 A1 * | 10/2024 | Lee | ........................ | H04W 52/02 |

OTHER PUBLICATIONS

CATT , "Summary of open issues for PDCCH", R2-2001913, 3GPP TSG-RAN WG2 Meeting #109 electronic, Elbonia, Agenda 6.11.2, Feb. 24-28, 2020, 13 pages.

U.S. Appl. No. 17/933,915, Notice of Allowance, Dec. 16, 2024, 9 pages.

* cited by examiner

*Primary Examiner* — Pao Sinkantarakorn
(74) *Attorney, Agent, or Firm* — Dorsey & Whitney LLP

(57) ABSTRACT

Systems and methods related to "on/off" determinations regarding the performance of physical downlink control channel (PDCCH) monitoring during connected mode discontinuous reception (CDRX) on duration windows are disclosed herein. In some cases, a radio access network (RAN) predicts whether a downlink (DL) packet for a UE will arrive at a buffer of the RAN prior to an end of a CDRX on duration window of the UE, and sends a downlink control information (DCI) with a cyclic redundancy check (CRC) scrambled by a power-saving radio network temporary identifier (PS-RNTI) (DCP) for the CDRX on duration window indicating whether or not the UE should perform PDCCH monitoring during the CDRX on duration window based on the prediction. In some cases, a UE determines a current state of DL traffic and adaptively uses DCP monitoring based on the current state of the traffic. Aggregation level adaptation by the RAN is also discussed.

15 Claims, 12 Drawing Sheets

SYSTEMS AND METHODS FOR CONNECTED MODE DISCONTINUOUS RECEPTION ON/OFF DETERMINATIONS

TECHNICAL FIELD

This application relates generally to wireless communication systems, including wireless communications systems capable of using downlink control information (DCI) with a cyclic redundancy check (CRC) scrambled by a power-saving radio network temporary identifier (PS-RNTI) (DCP) monitoring for corresponding connected mode discontinuous reception (CDRX) on duration windows.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and Institute of Electrical and Electronics Engineers (IEEE) 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 gigahertz (GHz) frequencies, some of which are bands that may be used by previous standards, and may potentially be extended to cover new spectrum offerings from 410 megahertz (MHz) to 7125 MHz. Frequency Range 2 (FR2) may include frequency bands from 24.25 GHz to 52.6 GHz. Note that in some systems, FR2 may also include frequency bands from 52.6 GHz to 71 GHz (or beyond). Bands in the millimeter wave (mmWave) range of FR2 may have smaller coverage but potentially higher available bandwidth than bands in FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
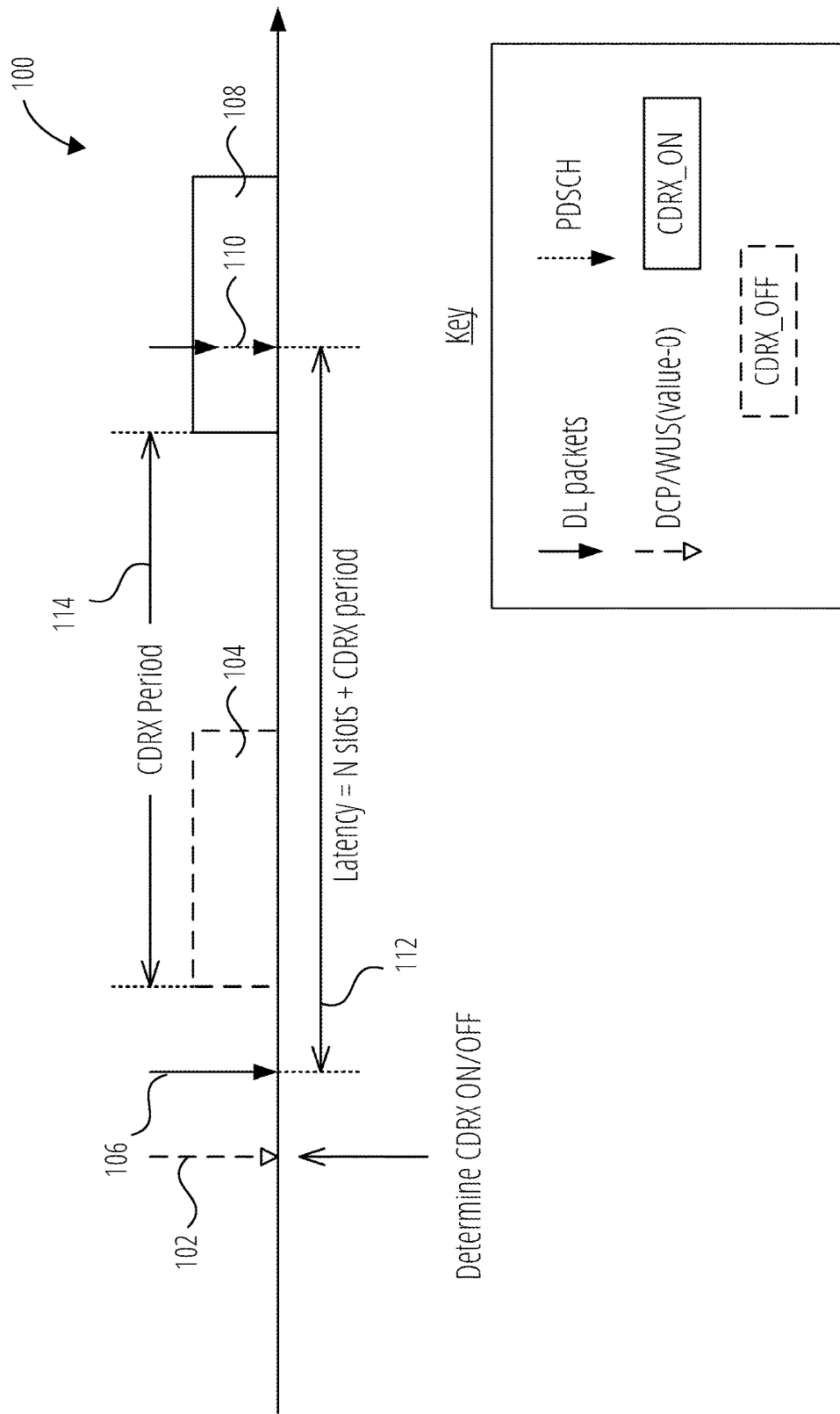
FIG. 1 illustrates a diagram showing a potential latency case that may occur in some wireless communications systems.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Some wireless communications systems implement connected mode discontinuous reception (CDRX) mechanisms that define CDRX on duration windows at a UE, during which the UE may, for example, monitor for physical downlink control channels (PDCCHs) having downlink control information (DCI) for the UE (that are used for e.g., for providing scheduling information from the network to the UE). The CDRX on duration windows may be defined such that the UE does not constantly perform such PDCCH monitoring. For example, a UE implementing a CDRX mechanism may use CDRX on duration windows of a defined length and that occur periodically according to a CDRX period greater than the defined length. Further, it may be that the UE does not perform PDCCH monitoring outside such CDRX on duration windows. The network may be aware of the timing the UE's CDRX on duration windows and may accordingly schedule PDCCHs for the UE during such on CDRX on duration windows. The use of such CDRX mechanisms accordingly saves power at the UE over a case where the UE instead performs PDCCH monitoring constantly.

In some wireless communications systems, wake up signaling corresponding to a CDRX mechanism may be used. This may allow the network to provide the UE with a wake up signal (WUS) corresponding to a CDRX on duration window of a CDRX mechanism used by the UE. The WUS may indicate to the UE whether or not it should perform PDCCH monitoring during the corresponding CDRX on duration window. The network may make such an indication using the WUS based on its determination of whether or not it will send, for example, a PDCCH to the UE during the corresponding CDRX on duration window. For example, if, at the time of the determination, there is/are one or more downlink (DL) packets for the UE at a buffer of the network, the network may understand that it will send a PDCCH (that schedules the receipt at the UE of those one or more DL packets) to the UE during the corresponding CDRX on duratino window. Further, if, at the time of the determination, there are no DL packets for the UE at a buffer of the network, the network may understand that it will not send a PDCCH to the UE during the corresponding CDRX on duration window.

Accordingly, in the case that the network determines that it will send a PDCCH to a UE during a first CDRX on duration window at the UE, it may send the UE a WUS corresponding to the first CDRX on duration window used by the UE with a 'value-1' that indicates that the UE is to start a drx-onDurationTimer for the corresponding CDRX on duration window, such that, for example, the UE treats the corresponding CDRX on duration window as 'active' for PDCCH monitoring purposes.

Further, in the case that the network determines that it will not send a PDCCH for the UE during a second CDRX on duration window at the UE, it may send the UE a WUS corresponding to the second CDRX on duration window with a 'value-0' that indicates the UE should not start a drx-onDurationTirner for the corresponding CDRX on duration window, such that, for example, the UE treats the corresponding CDRX on duration window as 'inactive' for PDCCH monitoring purposes.

The use of such WUSs may enable power savings at the UE that stem from the fact that the UE may ultimately perform PDCCH monitoring for fewer than all of the CDRX on duration windows.

The network may transmit the WUS via a PDCCH carrying DCI with a cyclic redundancy check (CRC) scrambled by a power-saving radio network temporary identifier (PS-RNTI) (DCP). The DCP may be transmitted on/configured for a DCP occasion, which may be a number N slots prior to a CDRX on duration offset for the beginning of a CDRX on duration window corresponding to the WUS of the DCP. Accordingly, it may be understood that such a DCP corresponds to the affected CDRX on duration window. A UE may perform DCP monitoring during the DCP occasion in order to receive such a DCP.

In various descriptions and/or figures herein, a CDRX on duration window at a UE that is inactive (e.g., not used) for purposes of PDCCH monitoring at a UE may be described/illustrated as being in an "OFF" or "CDRX_OFF" state. Further, in various descriptions and/or figures herein, a CDRX on duration window at a UE that is active (e.g., used) for purposes of PDCCH monitoring at a UE may be described/illustrated as being in an "ON" or "CDRX_ON" state.

Determinations of DCP Indications Based on Predicted Packets

FIG. 1 illustrates a diagram 100 showing a potential latency case that may occur in some wireless communications systems. As illustrated, a UE is configured with CDRX on duration windows (e.g., the first CDRX on duration window 104 and the second CDRX on duration window 108) that occur according to a CDRX period 114.

As illustrated, the network sends a DCP 102 to the UE at a DCP occasion that is N slots prior to a CDRX on duration offset for the beginning of the first CDRX on duration window 104 to which the DCP 102 corresponds. At the time of the DCP occasion for the DCP 102, it may be that there were no DL packets at the network for the UE. Accordingly, as illustrated, the DCP 102 indicates that the UE is not to perform PDCCH monitoring during the first CDRX on duration window 104 (e.g., the DCP 102 includes a 'value-0' indication).

Then, after the indication of the DCP 102 but prior to the end of the first CDRX on duration window 104, one or more DL packets 106 for the UE arrive at a buffer of the network. Because the DL packets 106 arrive prior to the end of the first CDRX on duration window 104, there is not necessarily any temporal restriction to the sending of the DL packets 106 during the first CDRX on duration window 104. However, because the DCP 102 indicating that the UE is not to perform PDCCH monitoring during the first CDRX on duration window 104 has already been sent, the UE is not performing PDCCH monitoring during the first CDRX on duration window 104—thus the network does not have the option to send the UE a scheduling DCI for the DL packets 106 within the first CDRX on duration window 104 with any expectation that it will be received at the UE.

Accordingly, as illustrated, the DL packets 106 may be pended until a second CDRX on duration window 108 during which the UE does perform PDCCH monitoring. At that point, the network is enabled to send the DL packets 106 in a physical downlink shared channel (PDSCH) 110 that is scheduled by a PDCCH sent during the second CDRX on duration window 108.

The pending of the DL packets 106 introduces a latency 112 that is of a duration of (up to) the applicable CDRX period 114 plus the N slots between the DL packets 106 and the beginning of the first CDRX on duration window 104, as measured between the time of arrival of the DL packets 106 at a buffer of the network and the time of transmission of the DL packets 106 to the UE during the second CDRX on duration window 108. In an example case of the use of voice over NR (VoNR), the CDRX period 114 may be 40 milliseconds (ms), meaning that the latency 112 may be of a duration of (up to) 40 ms plus the N slots between the DL packets 106 and the beginning of the first CDRX on duration window 104.

Such latencies may degrade performance of applications that use communications between the UE and the network.

To address such latency concerns, the network may determine WUSs for DCPs based on predicted DL packet arrivals. The network may collect packet arrival history data at buffer (e.g., a layer 2 (L2) buffer) of the network for a UE over time, and predict the arrival of one or more DL packets for the UE at the buffer of the network based on that packet arrival history data.

The network may then accordingly indicate whether or not PDCCH monitoring is to be performed during a CDRX on duration window based on such predictions. For example, if a DL packet is predicted to arrive at the buffer of the network during a window between the DCP occasion for a DCP and the end of a CDRX on duration window corresponding to the DCP, the network may configure the DCP to indicate that the UE should perform PDCCH monitoring during the corresponding CDRX on duration window (even if, for example, there are no DL packets for the UE at the buffer of the network at the time for transmitting the DCP). Otherwise (and, for example, assuming that there are not already DL packets for the UE at the buffer), the network may configure the DCP to indicate that the UE should not perform PDCCH monitoring during the corresponding CDRX on duration window.

The use of such a predictive framework may cause the UE to actively use (e.g., perform PDCCH monitoring during) CDRX on duration windows that would otherwise be left inactive even in cases where DL packets arrive at a buffer of the network after an applicable DCP occasion but where there is no actual temporal restriction for the use of the corresponding CDRX on duration window to transmit those DL packets, as described above in relation to FIG. 1. Accordingly, the latency issues described in relation to FIG. 1 may be alleviated.

Figure 2A:
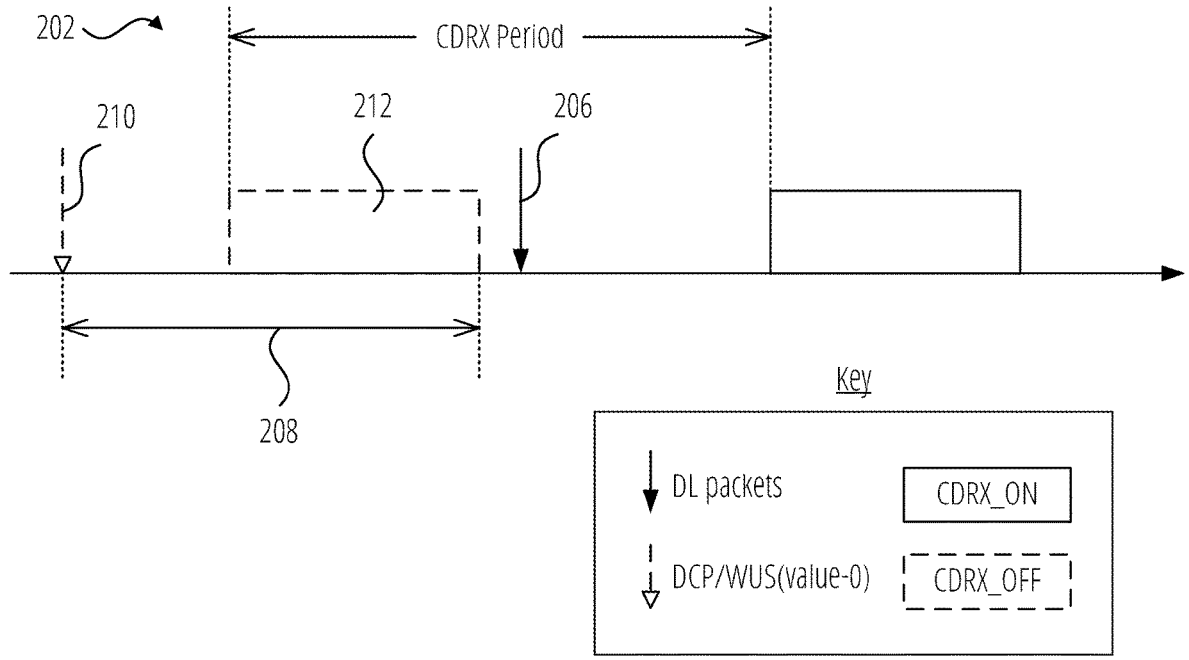
FIG. 2A and FIG. 2B illustrate cases under a predictive framework for DCP usage, according to embodiments herein.
Figure 2B:
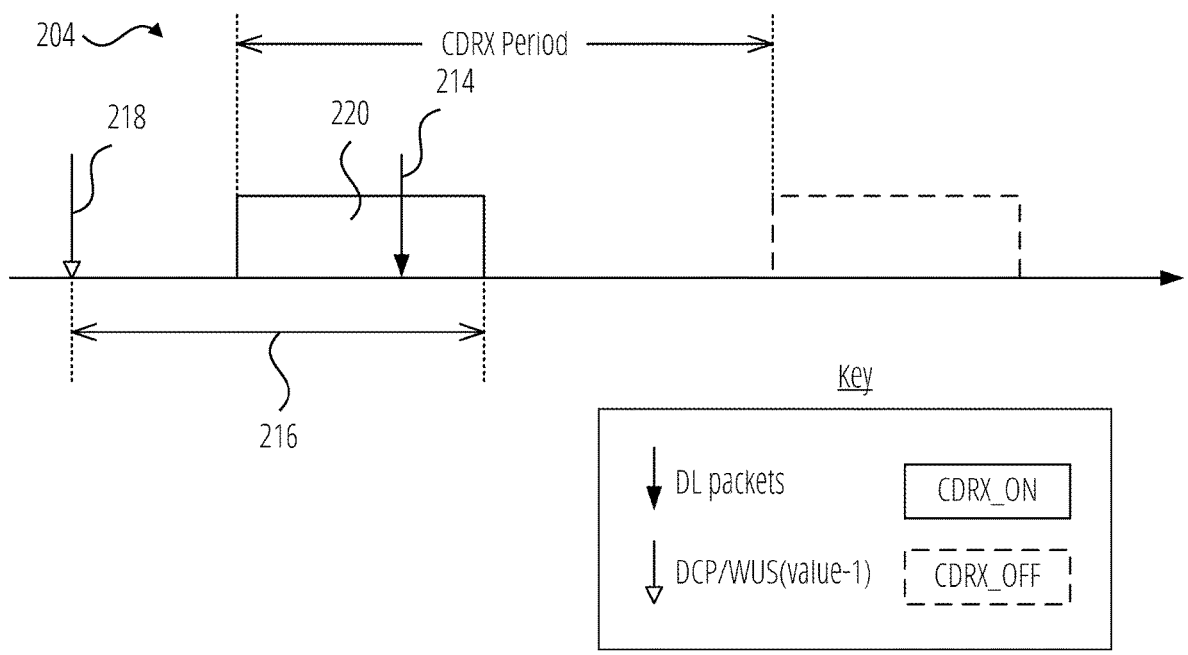

FIG. 2A and FIG. 2B illustrate cases 202, 204 under a predictive framework for DCP usage, according to embodiments herein. In a first case 202 illustrated in FIG. 2A, the network predicts that one or more DL packets 206 are to arrive outside of a prediction window 208 between the DCP occasion for the DCP 210 and the end of the CDRX on duration window 212. Accordingly, as illustrated, the network uses the DCP 210 to indicate that the UE should not perform PDCCH monitoring during the CDRX on duration window 212. As a result, as illustrated, the CDRX on duration window 212 is inactive (is not used by the UE for PDCCH monitoring).

In a second case 204 illustrated in FIG. 2B, the network predicts that one or more DL packets 214 are to arrive within a prediction window 216 between the DCP occasion for the DCP 218 and the end of the CDRX on duration window 220. Accordingly, as illustrated, the network uses the DCP 218 to indicate that the UE should perform PDCCH monitoring during the CDRX on duration window 212. As a result, as illustrated, the CDRX on duration window 220 is active (is used by the UE for PDCCH monitoring).

Various methods for making predictions regarding the arrival of one or more DL packets for a UE at a buffer of the network within a prediction window (e.g., as are used within the predictive framework described in relation to FIG. 2A and FIG. 2B) are now described.

In some cases, the UE may make such predictions for non-periodic traffic. In the case of non-periodic traffic, it is not possible to pre-determine a particular timestamp that is expected to be associated with future DL packets. In such cases, the network may use packet arrival history data to determine a probability that one or more DL packets may arrive at the buffer within a duration T from a prior DL packet, and then use this probability to predict whether a future DL packet will arrive within a window between the DCP occasion for a DCP and the end of the corresponding CDRX on duration window, as described above.

The network may monitor the packet arrival history data for DL packets to a UE and generate a cumulative distribution function (CDF) for a packet arrival interval based on packet arrival interval data from the packet arrival history data.

Figure 3:
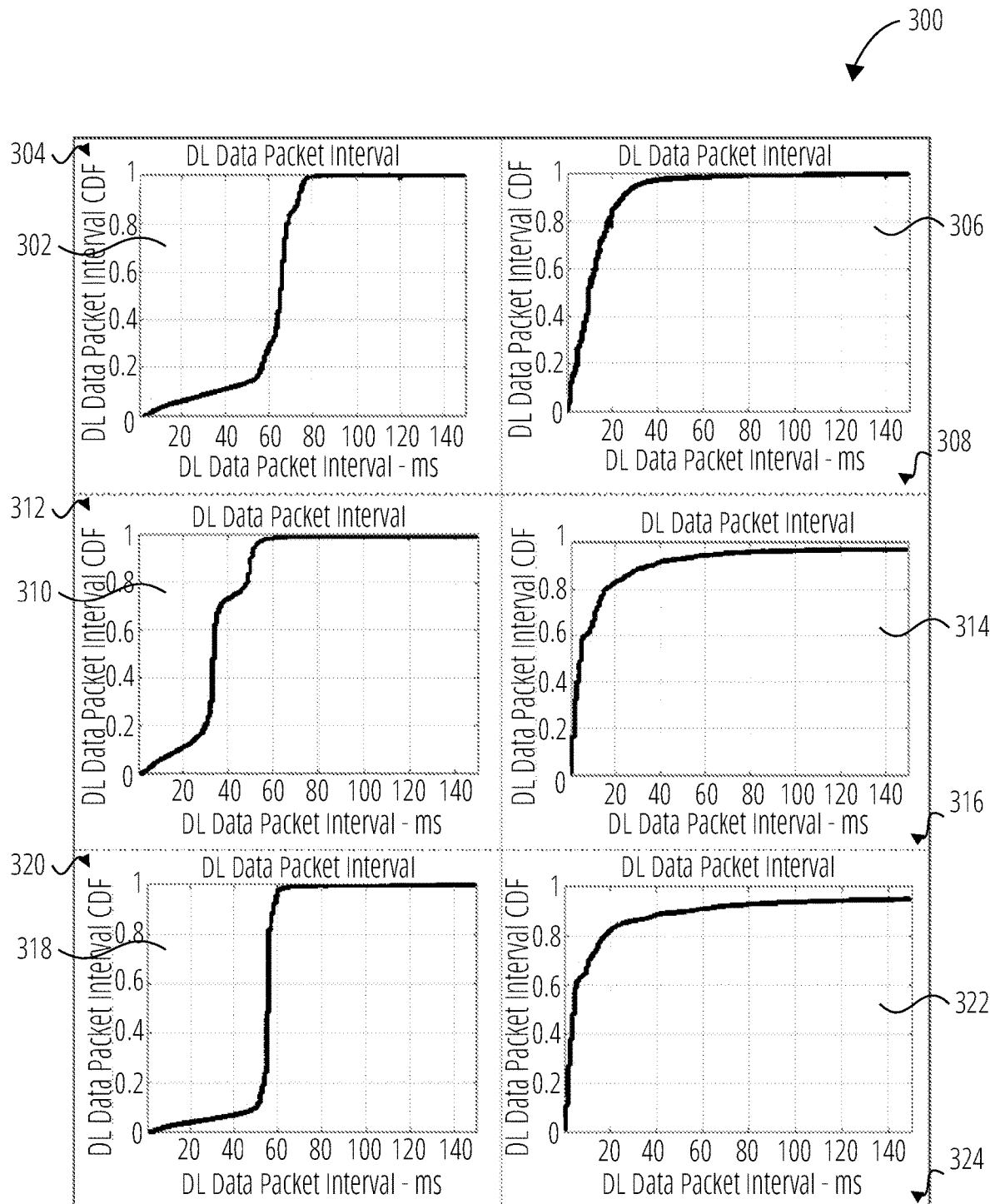
FIG. 3 illustrates various graphs for CDFs corresponding to the use of various applications such as may be determined at the network.

FIG. 3 illustrates various graphs 300 for CDFs corresponding to the use of various applications such as may be determined at the network. In other words, it may be that the first CDF for data packet interval 302 may be determined (for example) at the network in a case where the network and the UE communicate per the operation of the first application 304, the second CDF for data packet interval 306 may be determined (for example) at the network in a case where the network and the UE communicate per the operation of the second application 308, the third CDF for data packet interval 310 may be determined (for example) at the network in a case where the network and the UE communicate per the operation of the third application 312, the fourth CDF for data packet interval 314 may be determined (for example) at the network in a case where the network and the UE communicate per the operation of the fourth application 316, the fifth CDF for data packet interval 318 may be determined (for example) at the network in a case where the network and the UE communicate per the operation of the fifth application 320, and/or the sixth CDF for data packet interval 322 may be determined (for example) at the network in a case where the network and the UE communicate per the operation of the sixth application 324. As can be seen, a CDF determined by the network may be different based on the application(s) currently operating with communications between the network and the UE.

It is noted that the illustration in FIG. 3 of CDFs as associated with only a single application is given by way of example and not by way of limitation. In many cases contemplated herein, a network would calculate a CDF at the UE level (e.g., based on the DL packet arrival interval across DL packets of multiple/all applications using communications between the network and the UE).

Figure 4:
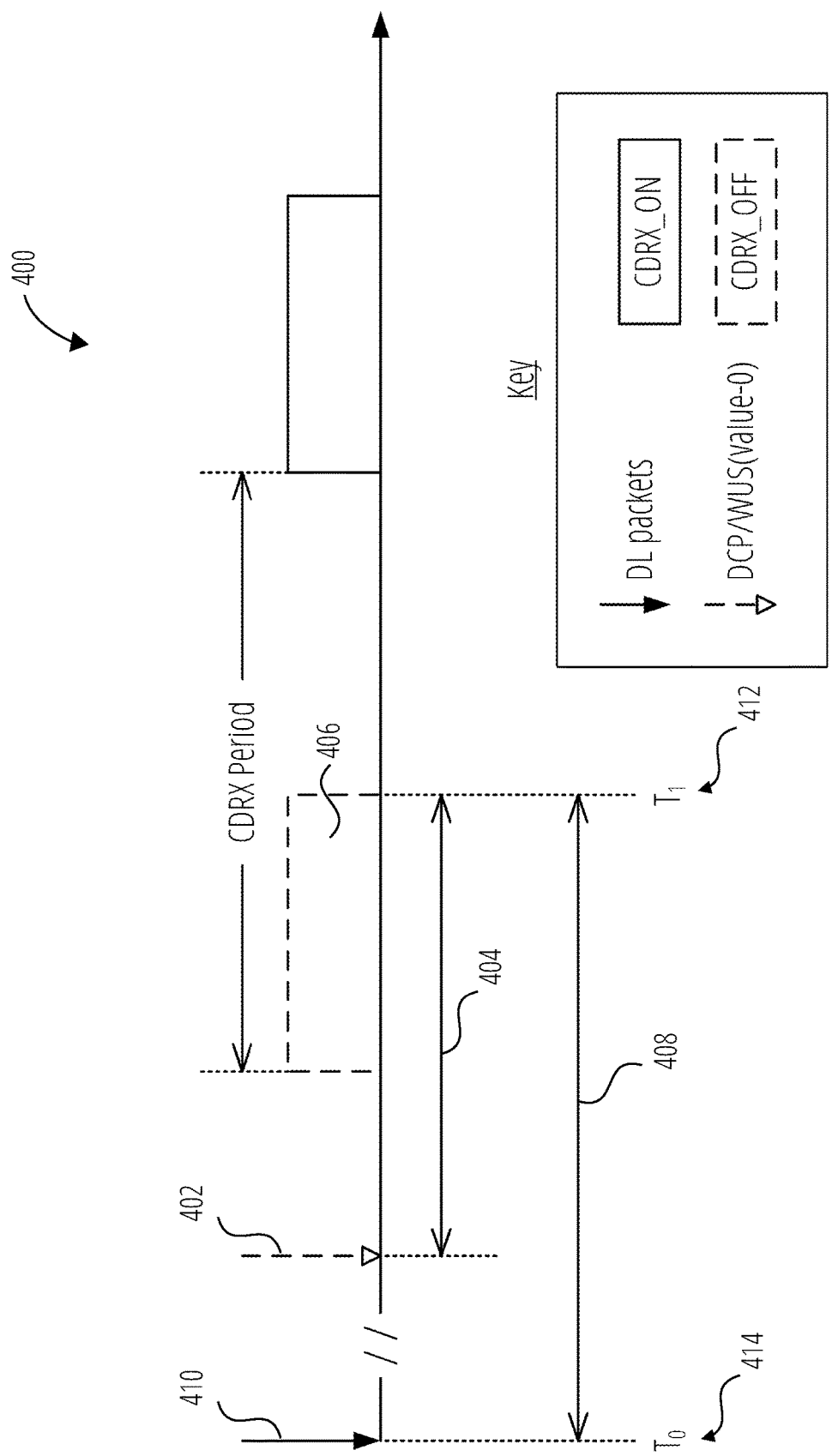
FIG. 4 illustrates a diagram showing a manner of predicting the arrival of a DL packet of non-periodic traffic using a CDF for packet arrival interval, according to embodiments herein.

FIG. 4 illustrates a diagram 400 showing a manner of predicting the arrival of a DL packet of non-periodic traffic using a CDF for packet arrival interval, according to embodiments herein. Corresponding to the discussion in FIG. 2A and FIG. 2B, by the time of the DCP occasion for a DCP 402, the network is to determine whether (or not) the DCP 402 should indicate that the UE is to perform PDCCH monitoring based on whether DL packet(s) are predicted to arrive within a prediction window 404 between the DCP occasion for the DCP 402 and the end of the corresponding CDRX on duration window 406.

To make a prediction on whether DL packet(s) will arrive within the prediction window 404, the network first calculates the probability of one or more DL packets arriving within the prediction window 404. First, the network calculates a check duration 408 by subtracting a time $T_0$ 414 of a previous packet 410 for the UE received at the buffer of the network (and which may have already been sent to the UE corresponding to an (unillustrated) previous CDRX on duration window) from a time $T_1$ 412 that is the end of the prediction window (e.g., the time of a last slot of the prediction window). Then, to arrive at the probability that one or more DL packets will arrive within the prediction window 404, the check duration 408 is applied to the CDF corresponding to the communications between the network and the UE.

The network then compares the determined probability to a threshold. If the probability is greater than (or alternatively greater than or equal to) the threshold, the network predicts that one or more DL packets for the UE will arrive at the buffer of the network during the prediction window 404. Accordingly, the network configures the DCP 402 to indicate that the UE should perform PDCCH monitoring during the CDRX on duration window 406.

Otherwise, if the probability is less than or equal to (or alternatively less than) the threshold, the network predicts that no DL packets for the UE will arrive at the buffer of the network during the prediction window 404. Accordingly, network configures the DCP 402 to indicate that the UE should not perform PDCCH monitoring during the CDRX on duration window 406. This is the case illustrated in FIG. 4.

In some cases, the threshold used may be determined at the network based on a network congestion state. For example, if there are many UEs to be scheduled in the CDRX on duration window 406 and the available physical resources are not sufficient to cover all the available UEs, then network may set a relatively higher threshold such that only indications to the UE to perform PDCCH monitoring that have a relatively higher probability of being correct are sent.

In some cases, the threshold used may be determined at the network based on a traffic type of the packet for the UE. For example, for some latency sensitive traffic (e.g., gaming traffic), the network could set a relatively lower threshold than a threshold that it sets for other latency non-sensitive traffic (which may accordingly be understood to use a relatively higher threshold), such that the network indicates to a UE via DCP(s) to perform PDCCH monitoring relatively more liberally for latency-sensitive traffic.

In some cases, the threshold used may be determined at the network based on a power use parameter that is applicable to the UE. For example, if the wireless communication system is deployed for low-power usage (with a correspondingly lower power use parameter applicable to the UE), the threshold set by the network could be relatively high in order to encourage relatively fewer indications that the UE should perform PDCCH monitoring.

In some cases, the UE may make predictions regarding the arrival of one or more DL packets for a UE at a buffer of the network within a prediction window for periodic traffic. For traffic with given period (e.g., voice traffic, some broadcasting traffic, etc.), the network may identify the periodicity of the traffic, a predicted timestamp for the one or more DL packets may be determined relative to the last received packet in the periodic traffic and the corresponding period, and the network may then evaluate whether that predicted timestamp falls within a window between the DCP occasion for a DCP and the end of the corresponding CDRX on duration window.

Note that while the traffic is understood by the network to be periodic, there may be variation as to the arrival time at the buffer of the network as compared to an alignment with an ideal periodicity for the traffic (e.g., due to latency from the peer-traffic side to the network). Variation as compared to the ideal periodicity for the traffic may be understood as a "latency offset" as described herein.

The network may monitor the packet arrival history data for DL packets to a UE in order to determine an applicable latency offset that may be used when determining a predicted time for an upcoming DL packet of periodic traffic.

Figure 5:
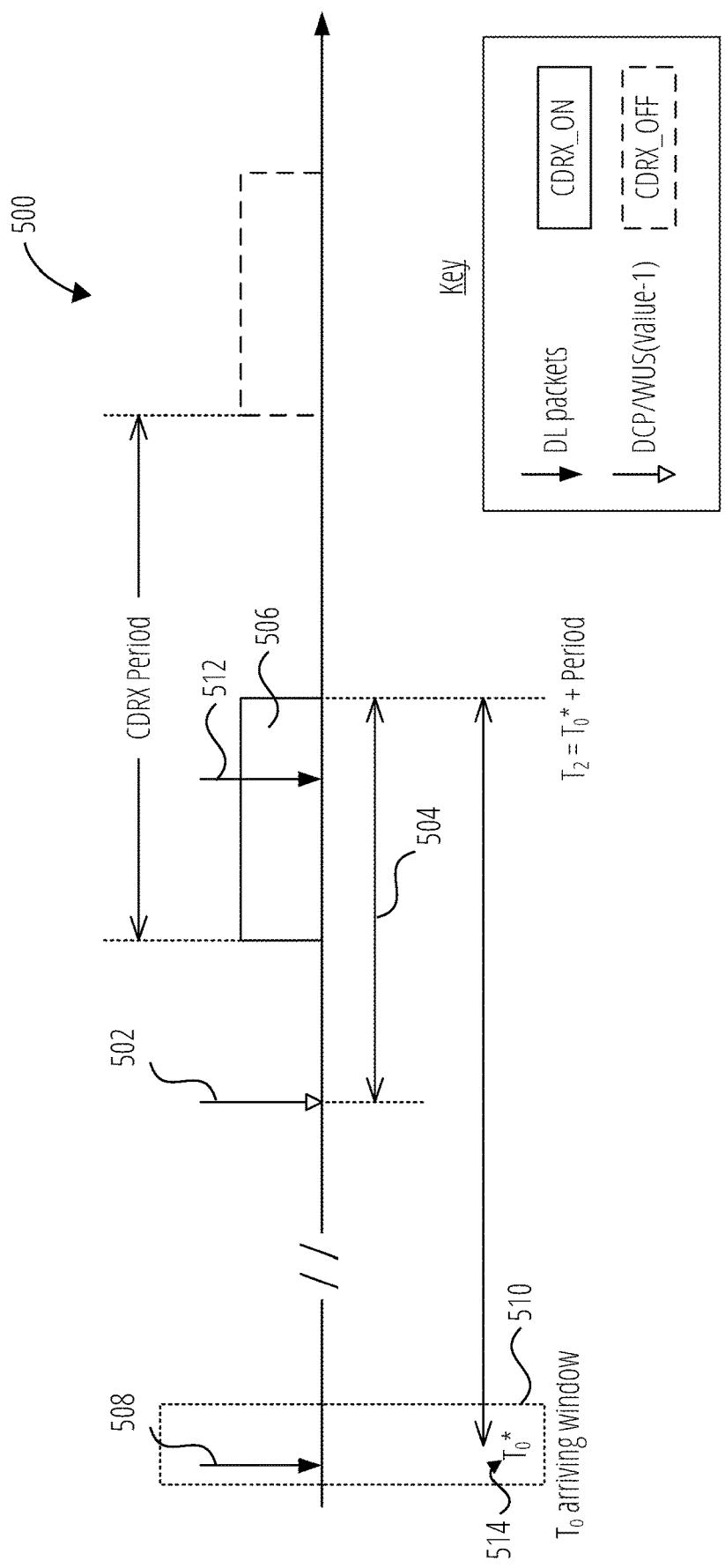
FIG. 5 illustrates a diagram showing a manner of predicting the arrival of a DL packet of periodic traffic, according to embodiments herein.

FIG. 5 illustrates a diagram 500 showing a manner of predicting the arrival of a DL packet of periodic traffic, according to embodiments herein. Corresponding to the discussion in FIG. 2A and FIG. 2B, by the time of the DCP occasion for a DCP 502, the network is to determine whether (or not) the DCP 502 should indicate that the UE is to perform PDCCH monitoring based on whether DL packet(s) are predicted to arrive within a prediction window 504 between the DCP occasion for the DCP 502 and the end of the corresponding CDRX on duration window 506.

The network first identifies whether or not the traffic is periodic traffic, based on the traffic property. FIG. 5 corresponds to the case where the network determines that the traffic is periodic. The network is accordingly aware of the (ideal) periodicity of the traffic.

The network then determines a predicted time for a next packet 512 (e.g., a predicted time for arrival of the next packet 512 at the buffer of the network). First, the network determines a latency offset 514 (labelled "$T_0^*$" in FIG. 5) of the periodic traffic based on packet arrival history data. As indicated, the network analyzes the packet arrival history data to determine an arrival window 510 representing an envelope for amounts of time after the beginnings of periods of the (ideal) periodicity at which corresponding DL packets arrived at the buffer of the network. Then, the network may select the latency offset 514 to use within the arrival window 510 based on various options (and note that the use of the '*' in the "$T_0^*$" in FIG. 5 is to denote that the particular latency offset 514 selected is according to one of potentially multiple options). For example, in a first option, the latency offset 514 used for the prediction may be selected to be the earliest arrival timing represented within the arrival window 510. In a second option, the latency offset 514 used for the prediction may be selected to be the most common arrival timing represented within the arrival window 510.

The network then predicts the time of the next packet 512 by adding the determined latency offset 514 and the applicable period for the periodic traffic to the time of a previous packet 508 of the traffic (which may have already been sent to the UE corresponding to an (unillustrated) previous CDRX on duration window). If the predicted time of the next packet 512 occurs during the prediction window 504, the network configures the DCP 502 to indicate that the UE should perform PDCCH monitoring during the CDRX on duration window 506 (this is the case illustrated in FIG. 5). Alternatively, if the predicted time of the next packet 512 does not occur during the prediction window 504, the network configures the DCP 502 to indicate that the UE should not perform PDCCH monitoring during the CDRX on duration window 506.

In some instances, periodic traffic may be capable of operating according to multiple states that may correspond to different applicable periodicities. For example, voice traffic may alternate between an active state and a silent state, where the periodicity for the traffic while in the active state is smaller than the periodicity for the traffic while in the silent state. In these and other such cases, it may be that if the periodic traffic undergoes a state change, a next packet may not arrive according to the predicted time calculated using the prior periodicity.

Accordingly, the network may be configured to monitor for a state change in the periodic traffic. When such a state change occurs, the network may reset or re-determine the periodicity of the periodic traffic and/or the applicable latency offset used for predicting times of arrival at the buffer of the network for DL packets of the periodic traffic.

Network Congestion Based PDCCH Aggregation Level Adaptation

In some cases, the network may configure CDRX offsets in a serving cell for some limited slots. In such cases, when the number of UEs served by the serving cell using a CD RX mechanism increases, corresponding PDCCH resources for DCP may be in high demand. In such cases, the network may perform a "best effort" to transmit as many DCPs indicating that their corresponding UEs should not perform PDCCH monitoring.

The network may adaptively adjust a PDCCH aggregation level applicable to the transmission of these DCPs according to the resource congestion for those DCPs. Multiple options are available for a given slot X, with a number M control channel element (CCE) resources, for a number N of UEs of the serving cell using a CDRX mechanism corresponding to the contested resources.

In a first option, the network equally allocates the M CCEs between the N UEs.

In a second option, the network allocates the M CCEs to UEs having the best relative signal quality among the UEs.

Regardless of the option used, the network configures a ps-Wakeup information element that is sent in a DRX-Adaptation configuration sent to each of the UEs to "true," such that any UE that fails to receive a DCP corresponding to a CDRX on duration window (either due to e.g., congestion in the case of either the first option or the second option, or due to the UE not having been allocated any of the M CCEs in the case of the second option) will by default perform PDCCH monitoring during the corresponding CDRX on duration window.

Then, the network sends a DCP indicating that PDCCH monitoring for a corresponding CDRX on duration window should not be performed to one or more of the UEs that have been allocated a portion of the M CCEs (under either option 1 or option 2). Such UEs that receive the DCPs do not perform PDCCH monitoring during the corresponding CDRX on duration window. UEs that do not receive DCPs (either due to e.g., congestion in the case of either the first option or the second option, or due to the UE not having been allocated any of the M CCEs in the case of the second option) perform PDCCH monitoring during the corresponding CDRX on duration window (due to the ps-Wakeup setting at the UE, as described above.

Figure 6:
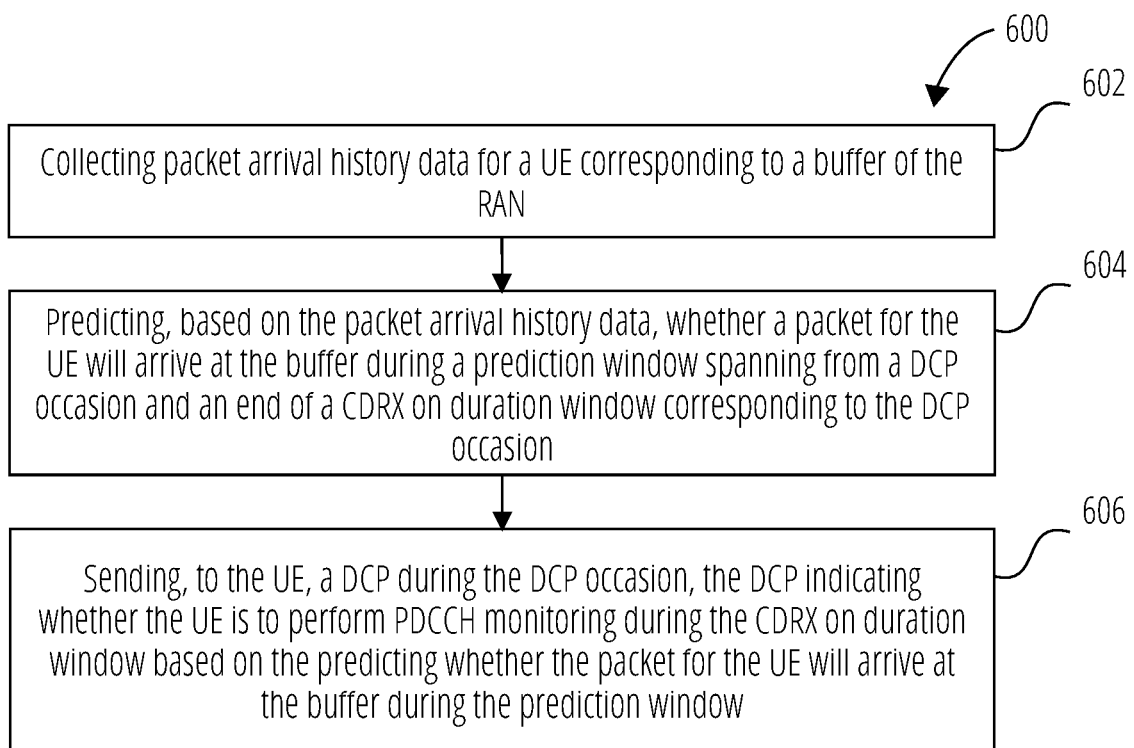
FIG. 6 illustrates a method of a RAN, according to embodiments herein.

FIG. 6 illustrates a method 600 of a RAN, according to embodiments herein. The method 600 includes collecting 602 packet arrival history data for a UE corresponding to a buffer of the RAN.

The method 600 further includes predicting 604, based on the packet arrival history data, whether a packet for the UE will arrive at the buffer during a prediction window spanning from a DCP occasion and an end of a CDRX on duration window corresponding to the DCP occasion.

The method 600 further includes sending 606, to the UE, a DCP during the DCP occasion, the DCP indicating whether the UE is to perform PDCCH monitoring during the CDRX on duration window based on the predicting whether the packet for the UE will arrive at the buffer during the prediction window.

In some embodiments of the method 600, the predicting whether the packet for the UE will arrive at the buffer during the prediction window includes determining a CDF for a packet arrival interval based on the packet arrival history data, identifying a check duration by subtracting a time of a previous packet for the UE from a time of an end of the prediction window, determining, by applying the check duration to the CDF, a probability that the packet will arrive at the buffer during the prediction window, and comparing the probability that the packet will arrive at the buffer during the prediction window to a threshold. In some of these cases, the method 600 further includes selecting the threshold based on a network congestion state. In some of these cases, the method 600 further includes selecting the threshold based on a traffic type of the packet for the UE. In some of these cases, the method 600 further includes selecting the threshold based on a power use parameter for the UE.

In some embodiments of the method 600, the packet is part of periodic traffic for the UE, and the predicting whether the packet for the UE will arrive at the buffer during the prediction window includes determining a periodicity of the periodic traffic, determining a latency offset of the periodic traffic based on the packet arrival history data, identifying a predicted time for the packet by adding the periodicity and the latency offset to a time of a previous packet for the UE, and determining whether the predicted time of the packet occurs during the prediction window. In some of these cases, the latency offset for the periodic traffic is determined based on an earliest arrival timing for the periodic traffic at the buffer relative to beginnings of periods of the periodicity. In some of these cases, the latency offset for the periodic traffic is determined based on a most common arrival timing for the periodic traffic at the buffer relative to beginnings of periods of the periodicity. In some of these cases, the method 600 further includes determining that the periodic traffic has experienced a state transition and re-determining the periodicity of the periodic traffic and the latency offset of the periodic traffic in response to the determining that the periodic traffic has experienced the state transition.

In some embodiments the method 600 further includes allocating available CCEs in a serving cell of the RAN that serves the UE among a plurality of UEs of the serving cell including the UE, wherein first one or more CCEs of the available CCEs are allocated to the UE, wherein the DCP is sent to the UE using the first one or more CCEs. In some of these cases, the plurality of UEs comprises all UEs of the serving cell, and the available CCEs are allocated evenly among the plurality of UEs. In some of these cases, the plurality of UEs comprises UEs of the serving cell having a signal quality that is above a threshold.

Adaptive DCP Monitoring Based on Traffic Patterns

As will be understood, a UE uses power when monitoring DCP occasions. For example, for a DCP occasion, the UE needs to wake up from sleep to synchronize timing and frequency (to reduce error) prior to the DCP, monitor for a DCP, and then gradually returns to sleep sometime after a DCP. These behaviors each consume power that may have not be consumed in a case where monitoring of the DCP occasion is not performed (e.g., this may be considered a "side impact" on consumed power related to WUS/DCP monitoring).

Accordingly, it is possible that in some high traffic scenarios, the monitoring of DCP occasions ultimately causes an overall higher power consumption over cases (assuming the same traffic) where DCP occasions are not monitored at the UE. For example, if traffic is available in each/most CDRX cycles, a UE may consume additional power for DCP monitoring over the case where DCP monitoring is not used.

Figure 7:
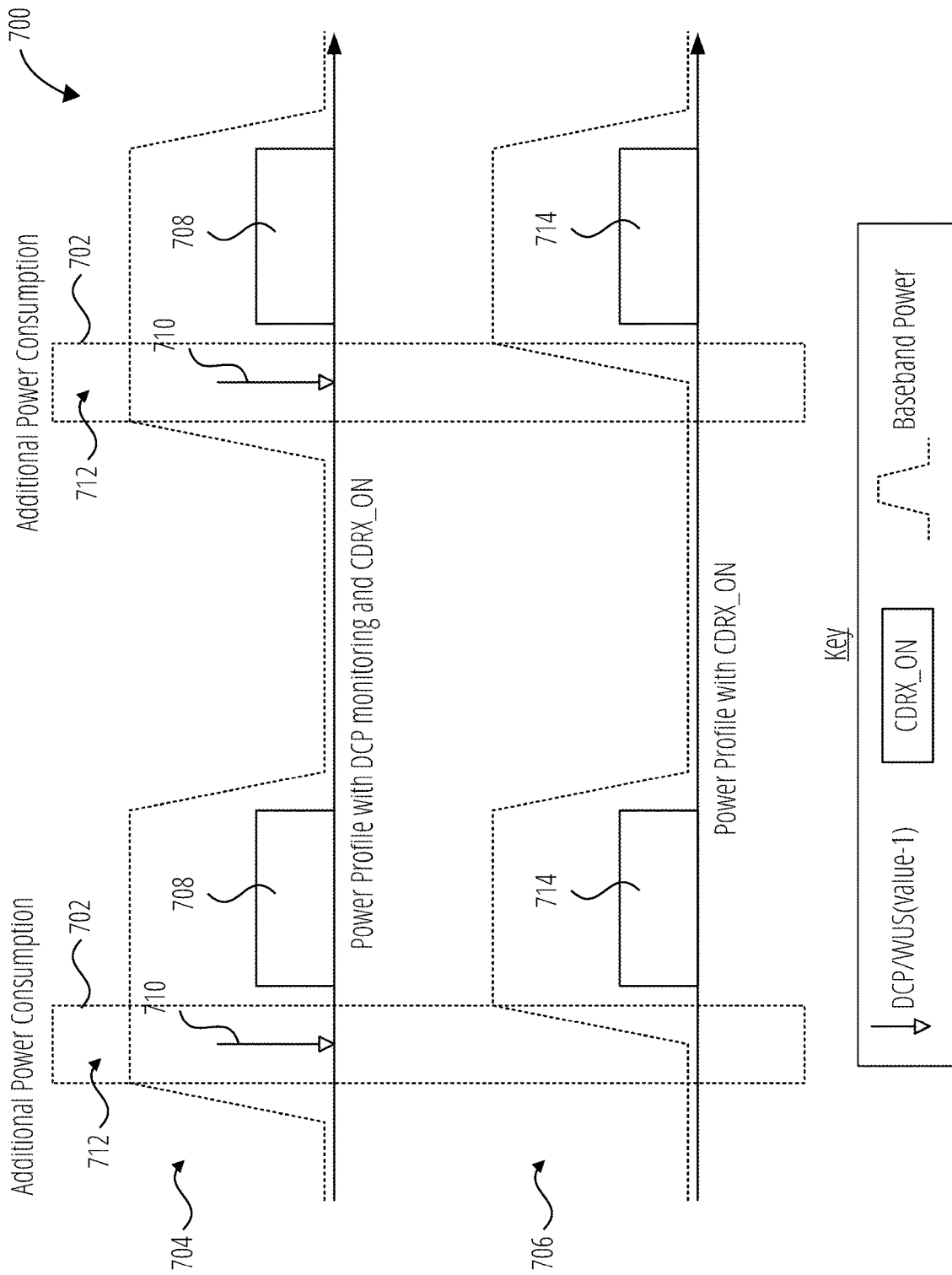
FIG. 7 illustrates a diagram illustrating additional power consumption that may occur in a first high-traffic case where a UE uses a DCP mechanism as compared to a second high-traffic case where a UE does not use a DCP mechanism.

FIG. 7 illustrates a diagram 700 illustrating additional power consumption 702 that may occur in a first high-traffic case 704 where a UE uses a DCP mechanism as compared to a second high-traffic case 706 where a UE does not use a DCP mechanism.

It is assumed (by way of illustrative example) that in each of the first high-traffic case 704 and the second high-traffic case 706, the nature of the traffic is such that a scheduling PDCCH is transmitted to the UE during each illustrated CDRX on duration window. In the first high-traffic case 704, it may be that a DCP mechanism is active as between the UE and the network. Due to the nature of the traffic, the network determines that the UE should perform PDCCH monitoring during each of the CDRX on duration windows 708. Accordingly, the network transmits each of the DCPs 710 indicating this for their corresponding ones of the CDRX on duration windows 708 to the UE. As can be seen, there is a non-zero amount of baseband power consumption 712 at the UE corresponding to the monitoring for and receipt of these DCPs 710 at the UE.

On the other hand, it may be that in the second high-traffic case 706, no DCP mechanism is active as between the UE and the network. Instead, the UE is configured (e.g., by default) to perform PDCCH monitoring each of the CDRX on duration windows 714. As may be seen, as compared to the UE of the first high-traffic case 704 where DCP monitoring is used, the UE of the second high-traffic case 706 uses less total baseband power.

Accordingly, it may be understood that in high-traffic scenarios corresponding to cases where many/all CDRX on duration windows have a PDCCH for the UE, it may be better (from a power use perspective) not to implement a DCP mechanism and for the UE to simply monitor all the CDRX on duration windows (e.g., by default).

UEs contemplated herein may be configured not to monitor for DCPs when large volume/high frequency of traffic is present, such that the UE and does not the consume power corresponding to the DCP monitoring. Further, as the traffic volume/frequency decreases, such a UE may start to perform DCP monitoring (for the chance of not having to perform PDCCH monitoring during the CDRX on duration window, at the cost of the power used for the DCP monitoring). Such embodiments may take into account whether the traffic is periodic in nature or not.

An adaptive DCP usage mechanism corresponding to periodic traffic is now described. One example of such periodic traffic may be, for example, voice traffic.

The network configures, to the UE, a ps-Wakeup information element that is sent in a DRX-Adaptation configuration to the UE to "true" such that when the UE is not performing DCP monitoring it performs PDCCH monitoring during all CDRX on duration windows.

Then, the UE monitors the state of downlink traffic and adaptively decides whether or not to perform DCP monitoring based on the state of the downlink traffic.

Figure 8:
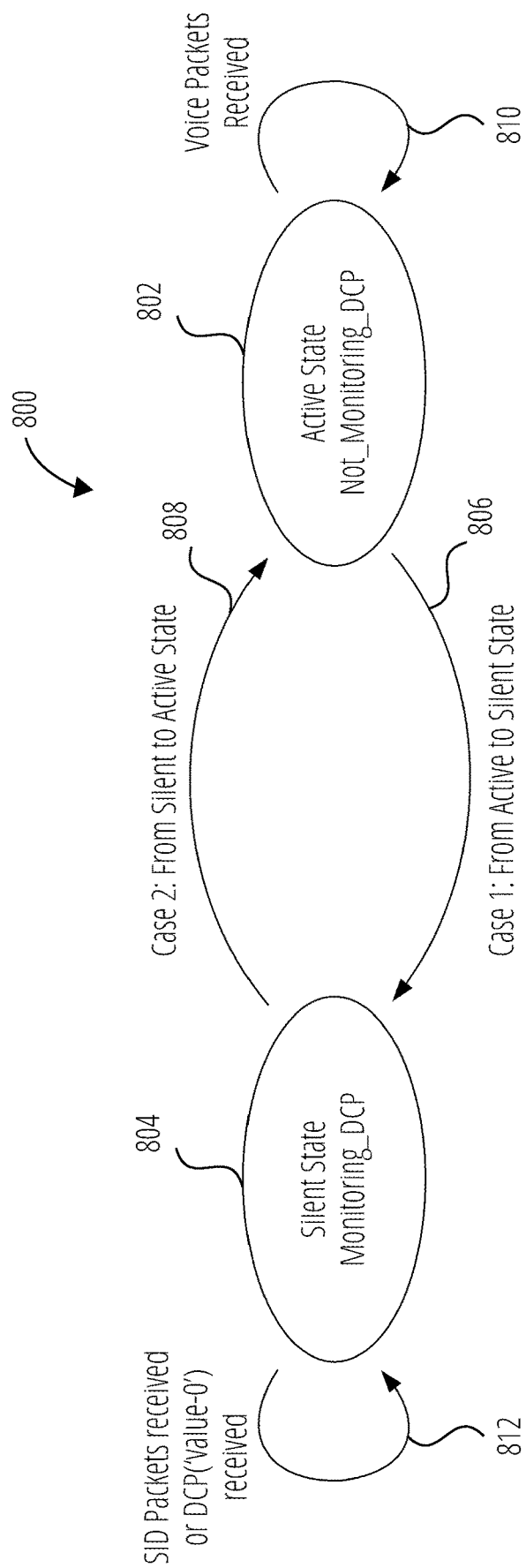
FIG. 8 illustrates a state diagram for the state of periodic downlink traffic, according to embodiments herein.

FIG. 8 illustrates a state diagram 800 for the state of periodic downlink traffic, according to embodiments herein. The state diagram 800 includes an active state 802, during which a volume/frequency of the traffic is high and DCP monitoring is not performed at the UE (e.g., incoming voice traffic of a voice call). The state diagram 800 further includes a silent state 804, during which the volume/frequency of the traffic is low and DCP monitoring is performed at the UE (e.g., silence during a voice call).

A first case ("Case 1" as illustrated in the state diagram 800) corresponds to conditions for an active state to silent state transition 806. While operating according to an assumption that the traffic is in the active state 802, the UE monitors for one or more conditions that may indicate that the traffic has made an active state to silent state transition 806. One or more options for conditions for the active state to silent state transition 806 may be applicable at the UE.

For example, in a first option, while the UE operates according to the active state 802 of the traffic, if there no PDCCH is detected for a consecutive number N of CDRX on duration windows, the UE may determine that the traffic has made the active state to silent state transition 806 and start to perform DCP monitoring according to the silent state 804 of the traffic.

In a second option, while the UE operates according to the active state 802 of the traffic, if the UE receives a consecutive number of X silence insertion description (SID) packets (e.g., corresponding to silence during a voice call), the UE may determine that the traffic has made the active state to silent state transition 806 and start to perform DCP monitoring according to the silent state 804 of the traffic.

A second case ("Case 2" as illustrated in the state diagram 800) corresponds to conditions for a silent state to active state transition 808. While operating according to an assumption that the traffic is in the silent state 804, the UE monitors for one or more conditions that may indicate that the traffic has made the silent state to active state transition 808. One or more options for conditions for the silent state to active state transition 808 may be applicable at the UE.

For example, in a first option, while the UE operates according to the silent state 804 of the traffic, if there is a DCP with 'value-1' and a PDCCH detected on the corresponding CDRX on duration window corresponding to a consecutive number N of CDRX on duration windows, the UE may determine that the traffic has made the silent state to active state transition 808 and skips or aborts DCP monitoring (instead performing PDCCH monitoring for each CDRX on duration window) according to the active state 802 of the traffic.

In a second option, while the UE operates according to the silent state 804 of the traffic, if the UE receives consecutive number X of active voice packets, the UE may determine that the traffic has made the silent state to active state transition 808 and skips or aborts DCP monitoring (instead performing PDCCH monitoring for each CDRX on duration window) according to the active state 802 of the traffic.

As illustrated, while the UE operates according to the active state 802, the reception of voice packets reconfirms 810 the active state 802 to the UE (during which the UE does not perform DCP monitoring). Further, as illustrated, while the UE operates according to the silent state 804, the reception of SID packets and/or a DCP with 'value-0' reconfirms 812 the silent state 804 to the UE (during which the UE performs DCP monitoring).

An adaptive DCP usage mechanism corresponding to non-periodic traffic is now described. The network configures, to the UE, a ps-Wakeup information element that is sent in a DRX-Adaptation configuration to the UE to "true" such that when the UE is not performing DCP monitoring it performs PDCCH monitoring during all CDRX on duration windows.

Then, the UE monitors downlink packets arrival intervals for the traffic and generates a CDF for a packet arrival interval for the traffic (e.g., based on packet arrival interval data from packet arrival history data for the traffic, as has been described elsewhere herein). The UE then uses this CDF to determine whether or not to perform DCP monitoring.

Figure 9:
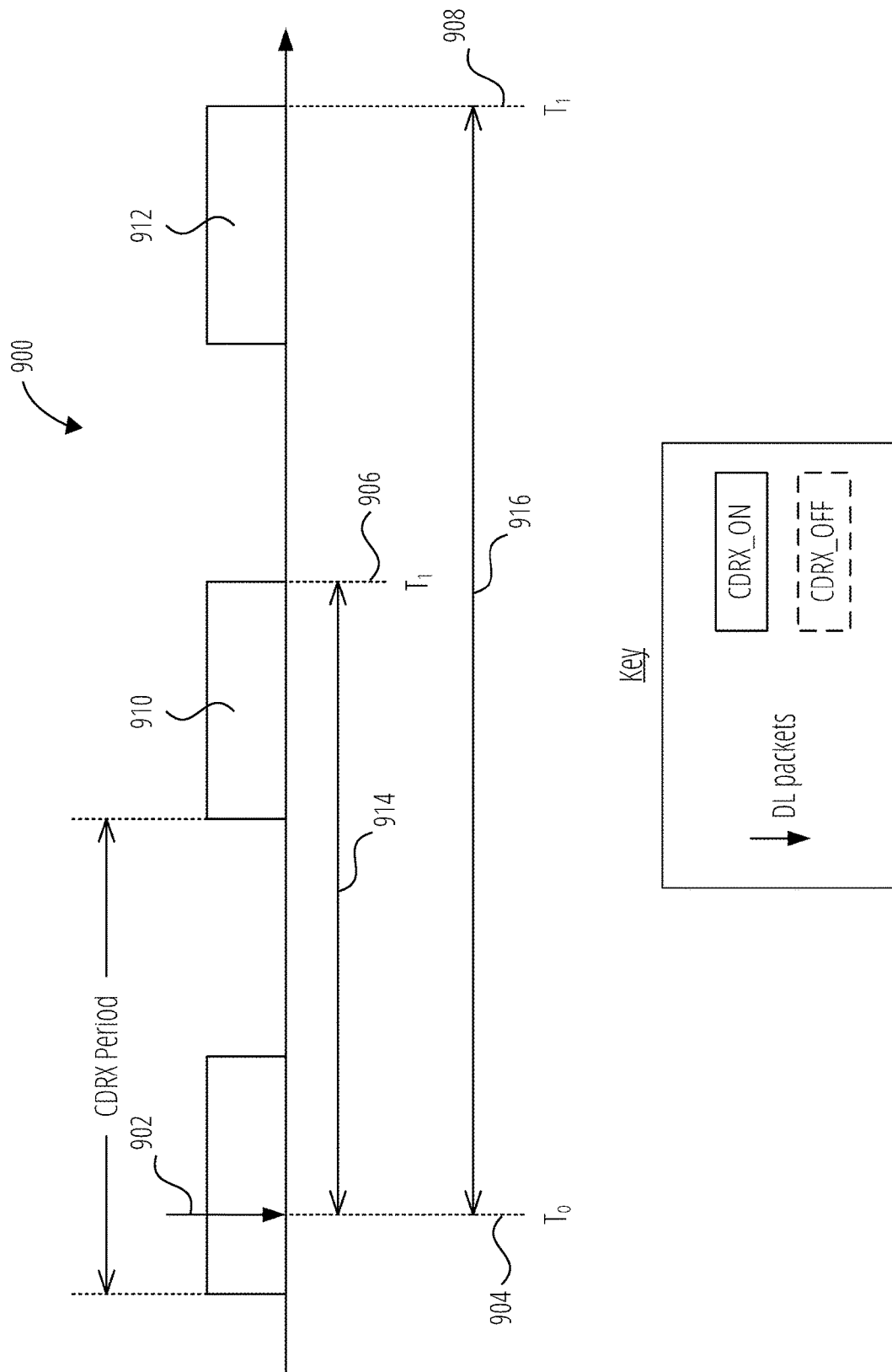
FIG. 9 illustrates a diagram showing a manner of using a CDF to determine whether to use DCP monitoring for non-periodic traffic, according to embodiments herein.

FIG. 9 illustrates a diagram 900 showing a manner of using a CDF to determine whether to use DCP monitoring for non-periodic traffic, according to embodiments herein.

For each upcoming CDRX on duration window (e.g., for each of the first upcoming CDRX on duration window 910 and the second upcoming CDRX on duration window 912), the UE calculates the probability of next packets arriving within that CDRX on duration window based on the time $T_0$ 904 of a last received packet 902 of the traffic.

The probability for a CDRX on duration window is calculated using a check duration corresponding to the CDRX on duration window, where the check is the duration from the time $T_0$ 904 of the last received packet 902 to a time $T_1$ of the end of the CDRX on duration window (e.g., a time of the last slot of the CDRX on duration window). As illustrated in FIG. 9, the first check duration 914 corresponding to the first upcoming CDRX on duration window 910 spans from the time $T_0$ 904 of the last received packet 902 to a first time $T_1$ 906 at the end of the first upcoming CDRX on duration window 910. Further, the second check duration 916 corresponding to the second upcoming CDRX on duration window 912 spans from the time T 904 of the last received packet 902 to a second time $T_1$ 908 at the end of the second upcoming CDRX on duration window 912.

Then, the UE determines the probability that there will be one or more packets of the traffic in a CDRX on duration window by applying the check duration corresponding to the CDRX on duration window to the CDF for the packet arrival interval for the traffic. For example, a first probability that there will be a packet of the traffic in the first upcoming CDRX on duration window 910 is calculated by applying the first check duration 914 to the CDF. Further, a second probability that there will be a packet of the traffic in the second upcoming CDRX on duration window 912 is calculated by applying the second check duration 916 to the CDF.

Then, for CDRX on duration windows where the corresponding probability as calculated is lower than (or lower than or equal to) a threshold, the UE decides to configure a PS-RNTI such that DCP monitoring is performed corresponding to that CDRX on duration window. On the other hand, for CDRX on duration windows where the corresponding probability as calculated is greater than or equal to (or greater than) the threshold, the UE aborts or skips DCP monitoring and perform (e.g., by default) PDCCH monitoring during the CDRX on duration window.

For example, it may be that in the diagram 900, the first probability associated with the first check duration 914 is such that the UE performs DCP monitoring for the first upcoming CDRX on duration window 910 (in order to determine, based on the result of the DCP monitoring, whether to perform PDCCH monitoring during the first upcoming CDRX on duration window 910), while the second probability associated with the second check duration 916 is such that the UE performs PDCCH monitoring during the second upcoming CDRX on duration window 912 (e.g., by default, without/by aborting/by skipping any DCP monitoring for the second upcoming CDRX on duration window 912).

In some embodiments, the threshold used may be set at the UE. In some cases, the threshold selected at the UE may be based on the power overhead for DCP monitoring per a platform/software associated baseline at the UE. For example, if the power overhead for DCP monitoring based on the platform/software associated baseline of the UE is low, the threshold selected by the UE may be relatively higher (such that DCP monitoring is more permissively used).

In some cases, the threshold selected at the UE may be based on the network-configured offset/amount of time between a DCP occasion and the CRDX on duration window. With a smaller offset, the power consumption for DCP monitoring is less. Accordingly, if the offset is small, the threshold selected by the UE may be relatively higher (such that DCP monitoring is more permissively used).

Figure 10:
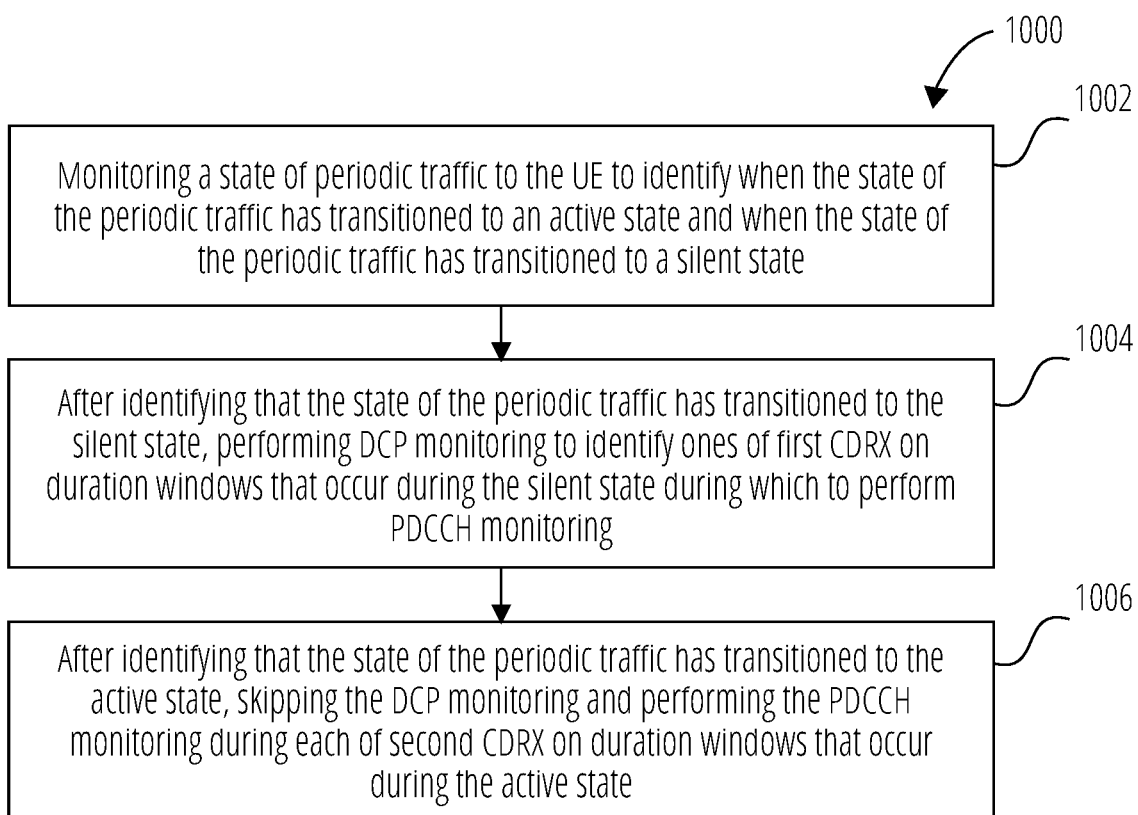
FIG. 10 illustrates a method of a UE, according to embodiments herein.

FIG. 10 illustrates a method 1000 of a UE, according to embodiments herein. The method 1000 includes monitoring 1002 a state of periodic traffic to the UE to identify when the state of the periodic traffic has transitioned to an active state and when the state of the periodic traffic has transitioned to a silent state.

The method 1000 further includes, after identifying that the state of the periodic traffic has transitioned to the silent state, performing 1004 DCP monitoring to identify ones of first CDRX on duration windows that occur during the silent state during which to perform PDCCH monitoring.

The method 1000 further includes, after identifying that the state of the periodic traffic has transitioned to the active state, skipping 1006 the DCP monitoring and performing the PDCCH monitoring during each of second CDRX on duration windows that occur during the active state.

In some embodiments of the method 1000, the UE identifies that the state of the periodic traffic has transitioned to the silent state by determining that no PDCCH has been detected for a number N of consecutive CDRX on duration windows.

In some embodiments of the method 1000, the UE identifies that the state of the periodic traffic has transitioned to the silent state by determining that a number N of consecutive silence insertion description (SID) packets have been received.

In some embodiments of the method 1000, the UE identifies that the state of the periodic traffic has transitioned to the active state by determining that it has received a number N of consecutive DCPs indicating that PDCCH monitoring is to be performed during corresponding CDRX on duration windows and a PDCCH during each of the corresponding CDRX on duration windows.

In some embodiments of the method 1000, the UE identifies that the state of the periodic traffic has transitioned to the active state by determining that it has received a number N of consecutive active voice packets.

Figure 11:
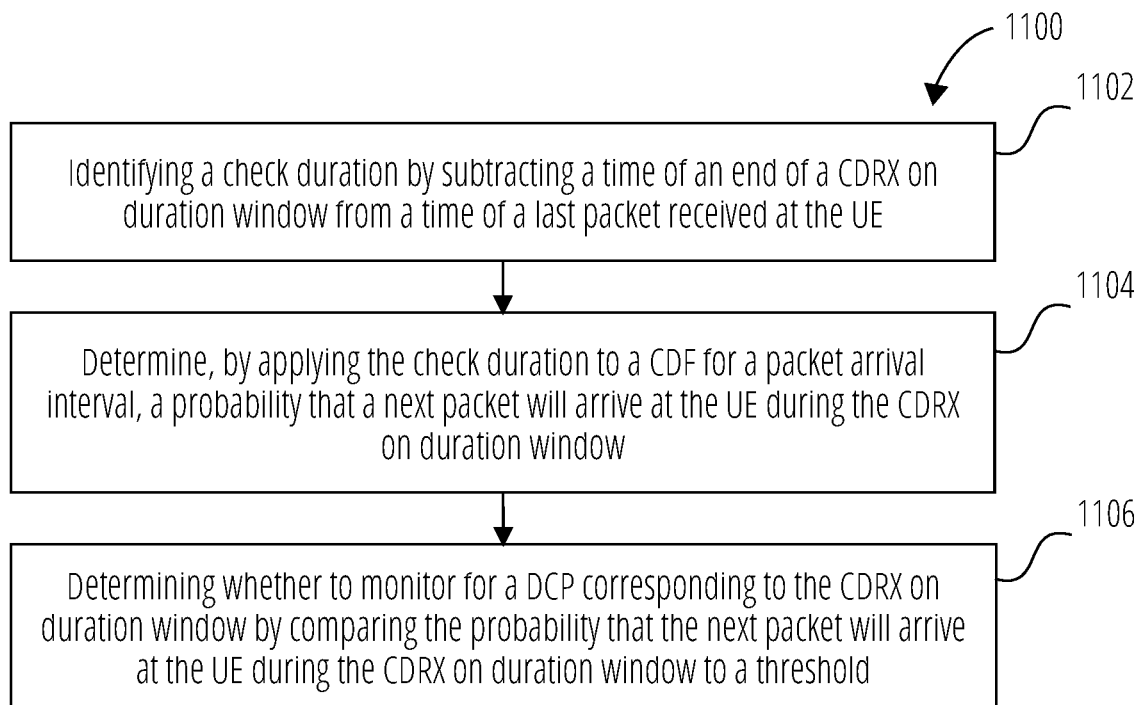
FIG. 11 illustrates a method of a UE according to embodiments herein.

FIG. 11 illustrates a method 1100 of a UE according to embodiments herein. The method 1100 includes identifying 1102 a check duration by subtracting a time of an end of a CDRX on duration window from a time of a last packet received at the UE.

The method 1100 further includes determining 1104, by applying the check duration to a CDF for a packet arrival interval, a probability that a next packet will arrive at the UE during the CDRX on duration window.

The method 1100 further includes determining 1106 whether to monitor for a DCP corresponding to the CDRX on duration window by comparing the probability that the next packet will arrive at the UE during the CDRX on duration window to a threshold.

In some embodiments, the method 1100 further includes selecting the threshold based on a power overhead for monitoring the DCP.

In some embodiments, the method 1100 further includes selecting the threshold based on an amount of time between the DCP and the CDRX on duration window.

In some embodiments, the method 1100 further includes collecting packet arrival history data for packets received at the UE and determining the CDF for the packet arrival interval based on the packet arrival history data.

Figure 12:
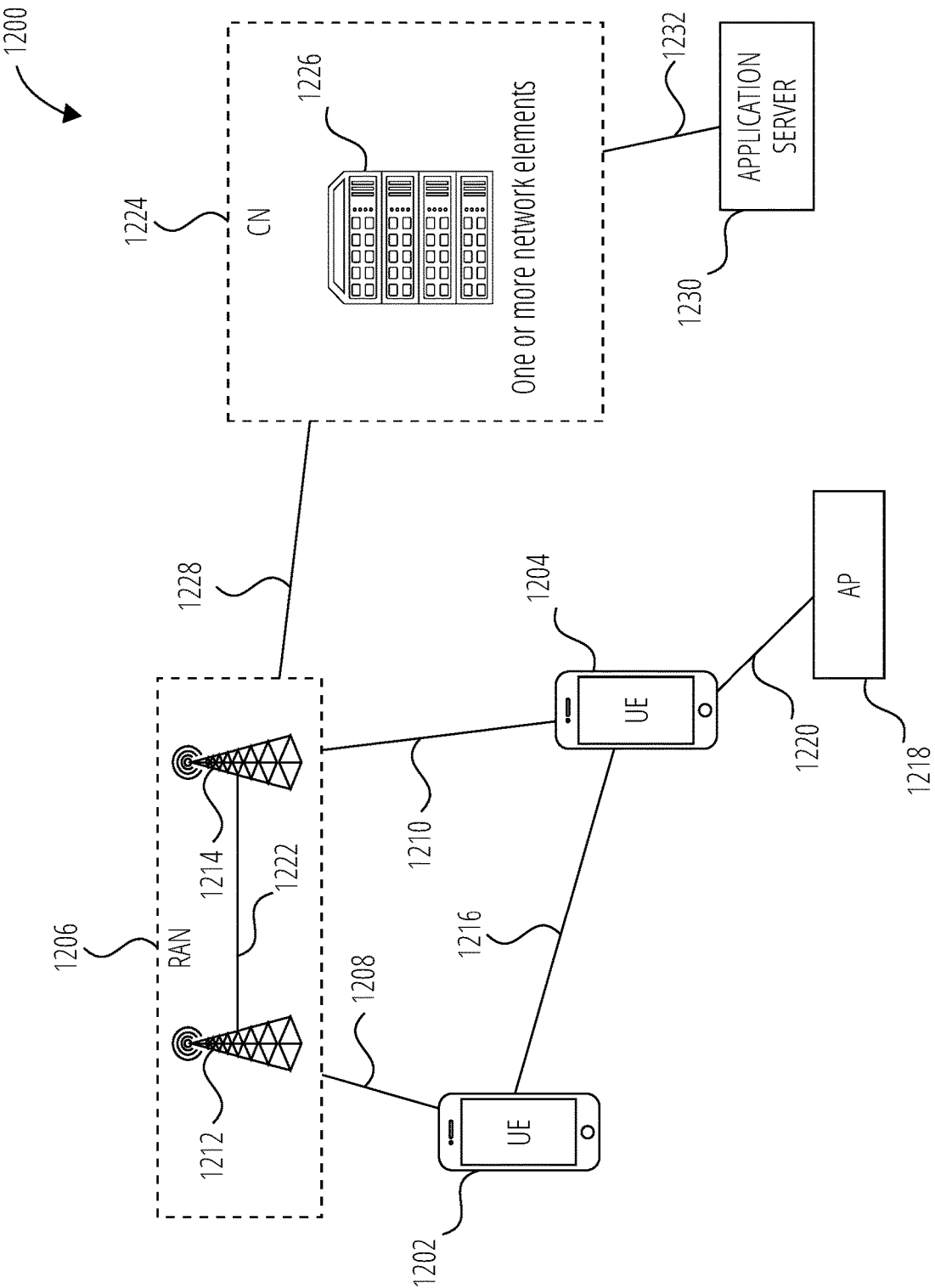
FIG. 12 illustrates an example architecture of a wireless communication system, according to embodiments disclosed herein.

FIG. 12 illustrates an example architecture of a wireless communication system 1200, according to embodiments disclosed herein. The following description is provided for an example wireless communication system 1200 that operates in conjunction with the LTE system standards and/or 5G or NR system standards as provided by 3GPP technical specifications.

As shown by FIG. 12, the wireless communication system 1200 includes UE 1202 and UE 1204 (although any number of UEs may be used). In this example, the UE 1202 and the UE 1204 are illustrated as smartphones (e.g., handheld touchscreen mobile computing devices connectable to one or more cellular networks), but may also comprise any mobile or non-mobile computing device configured for wireless communication.

The UE 1202 and UE 1204 may be configured to communicatively couple with a RAN 1206. In embodiments, the RAN 1206 may be NG-RAN, E-UTRAN, etc. The UE 1202 and UE 1204 utilize connections (or channels) (shown as connection 1208 and connection 1210, respectively) with the RAN 1206, each of which comprises a physical communications interface. The RAN 1206 can include one or more base stations (such as base station 1212 and base station 1214) that enable the connection 1208 and connection 1210.

In this example, the connection 1208 and connection 1210 are air interfaces to enable such communicative coupling, and may be consistent with RAT(s) used by the RAN 1206, such as, for example, an LTE and/or NR.

In some embodiments, the UE 1202 and UE 1204 may also directly exchange communication data via a sidelink interface 1216. The UE 1204 is shown to be configured to access an access point (shown as AP 1218) via connection 1220. By way of example, the connection 1220 can comprise a local wireless connection, such as a connection consistent with any IEEE 802.11 protocol, wherein the AP 1218 may comprise a Wi-Fi® router. In this example, the AP 1218 may be connected to another network (for example, the Internet) without going through a CN 1224.

In embodiments, the UE 1202 and UE 1204 can be configured to communicate using orthogonal frequency division multiplexing (OFDM) communication signals with each other or with the base station 1212 and/or the base station 1214 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1212 or base station 1214 may be implemented as one or more software entities running on server computers as part of a virtual network. In addition, or in other embodiments, the base station 1212 or base station 1214 may be configured to communicate with one another via interface 1222. In embodiments where the wireless communication system 1200 is an LTE system (e.g., when the CN 1224 is an EPC), the interface 1222 may be an X2 interface. The X2 interface may be defined between two or more base stations (e.g., two or more eNBs and the like) that connect to an EPC, and/or between two eNBs connecting to the EPC. In embodiments where the wireless communication system 1200 is an NR system (e.g., when CN 1224 is a 5GC), the interface 1222 may be an Xn interface. The Xn interface is defined between two or more base stations (e.g., two or more gNBs and the like) that connect to 5GC, between a base station 1212 (e.g., a gNB) connecting to 5GC and an eNB, and/or between two eNBs connecting to 5GC (e.g., CN 1224).

The RAN 1206 is shown to be communicatively coupled to the CN 1224. The CN 1224 may comprise one or more network elements 1226, which are configured to offer various data and telecommunications services to customers/subscribers (e.g., users of UE 1202 and UE 1204) who are connected to the CN 1224 via the RAN 1206. The components of the CN 1224 may be implemented in one physical device or separate physical devices including components to read and execute instructions from a machine-readable or computer-readable medium (e.g., a non-transitory machine-readable storage medium).

In embodiments, the CN 1224 may be an EPC, and the RAN 1206 may be connected with the CN 1224 via an S1 interface 1228. In embodiments, the S1 interface 1228 may be split into two parts, an S1 user plane (S1-U) interface, which carries traffic data between the base station 1212 or base station 1214 and a serving gateway (S-GW), and the S1-MME interface, which is a signaling interface between the base station 1212 or base station 1214 and mobility management entities (MMEs).

In embodiments, the CN 1224 may be a 5GC, and the RAN 1206 may be connected with the CN 1224 via an NG interface 1228. In embodiments, the NG interface 1228 may be split into two parts, an NG user plane (NG-U) interface, which carries traffic data between the base station 1212 or base station 1214 and a user plane function (UPF), and the S1 control plane (NG-C) interface, which is a signaling interface between the base station 1212 or base station 1214 and access and mobility management functions (AMFs).

Generally, an application server 1230 may be an element offering applications that use internet protocol (IP) bearer resources with the CN 1224 (e.g., packet switched data services). The application server 1230 can also be configured to support one or more communication services (e.g., VoIP sessions, group communication sessions, etc.) for the UE 1202 and UE 1204 via the CN 1224. The application server 1230 may communicate with the CN 1224 through an IP communications interface 1232.

Figure 13:
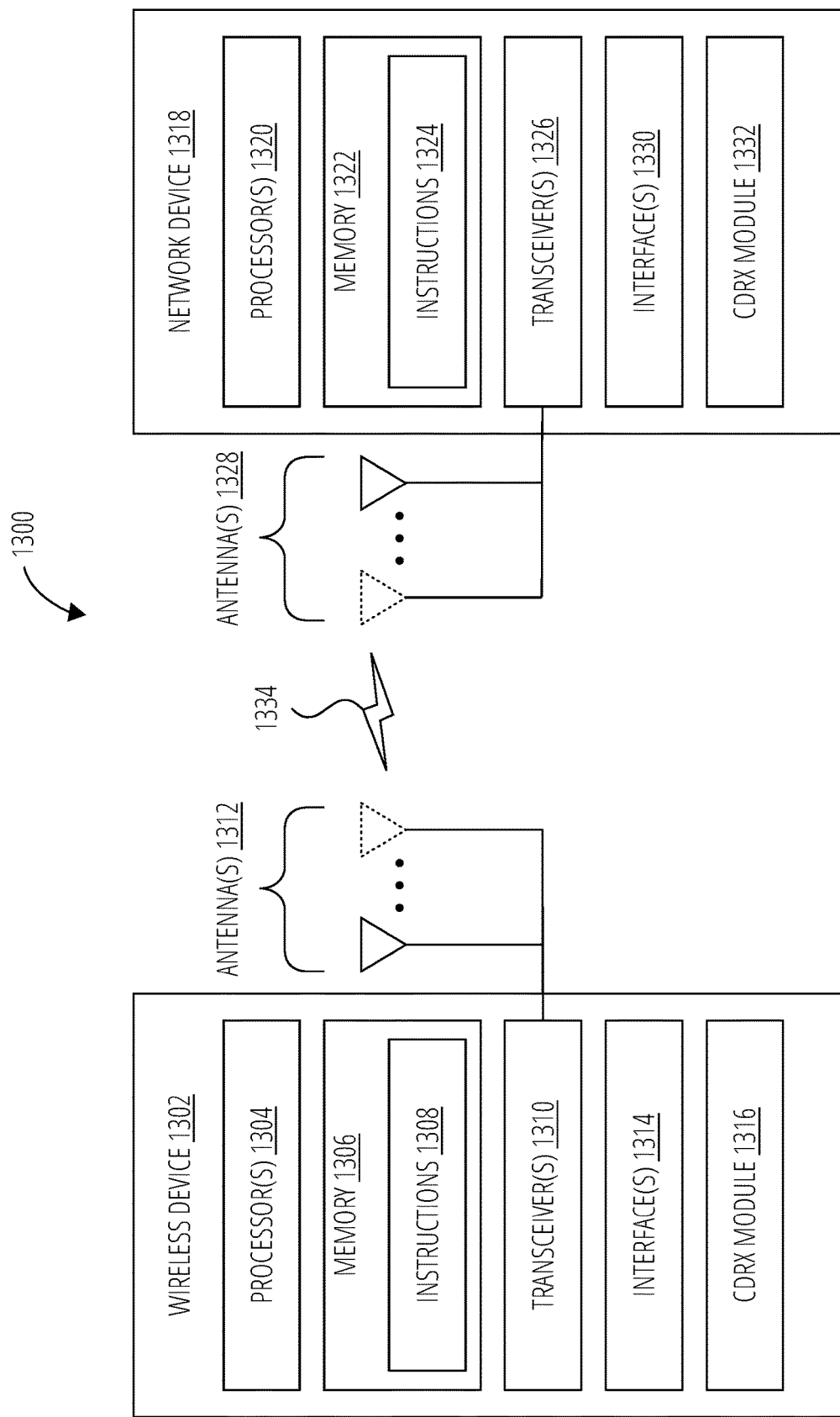
FIG. 13 illustrates a system for performing signaling between a wireless device and a network device, according to embodiments disclosed herein.

FIG. 13 illustrates a system 1300 for performing signaling 1334 between a wireless device 1302 and a network device 1318, according to embodiments disclosed herein. The system 1300 may be a portion of a wireless communications system as herein described. The wireless device 1302 may be, for example, a UE of a wireless communication system. The network device 1318 may be, for example, a base station (e.g., an eNB or a gNB) of a wireless communication system.

The wireless device 1302 may include one or more processor(s) 1304. The processor(s) 1304 may execute instructions such that various operations of the wireless device 1302 are performed, as described herein. The processor(s) 1304 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1302 may include a memory 1306. The memory 1306 may be a non-transitory computer-readable storage medium that stores instructions 1308 (which may include, for example, the instructions being executed by the processor(s) 1304). The instructions 1308 may also be referred to as program code or a computer program. The memory 1306 may also store data used by, and results computed by, the processor(s) 1304.

The wireless device 1302 may include one or more transceiver(s) 1310 that may include radio frequency (RF) transmitter and/or receiver circuitry that use the antenna(s) 1312 of the wireless device 1302 to facilitate signaling (e.g., the signaling 1334) to and/or from the wireless device 1302 with other devices (e.g., the network device 1318) according to corresponding RATs.

The wireless device 1302 may include one or more antenna(s) 1312 (e.g., one, two, four, or more). For embodiments with multiple antenna(s) 1312, the wireless device 1302 may leverage the spatial diversity of such multiple antenna(s) 1312 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1302 may be accomplished according to precoding (or digital beamforming) that is applied at the wireless device 1302 that multiplexes the data streams across the antenna(s) 1312 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1302 may implement analog beamforming techniques, whereby phases of the signals sent by the antenna(s) 1312 are relatively adjusted such that the (joint) transmission of the antenna(s) 1312 can be directed (this is sometimes referred to as beam steering).

The wireless device 1302 may include one or more interface(s) 1314. The interface(s) 1314 may be used to provide input to or output from the wireless device 1302. For example, a wireless device 1302 that is a UE may include interface(s) 1314 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1310/antenna(s) 1312 already described) that allow for communication between the UE and other devices and may operate according to known protocols (e.g., Wi-Fi®, Bluetooth®, and the like).

The wireless device 1302 may include a CDRX module 1316. The CDRX module 1316 may be implemented via hardware, software, or combinations thereof. For example, the CDRX module 1316 may be implemented as a processor, circuit, and/or instructions 1308 stored in the memory 1306 and executed by the processor(s) 1304. In some examples, the CDRX module 1316 may be integrated within the processor(s) 1304 and/or the transceiver(s) 1310. For example, the CDRX module 1316 may be implemented by a combination of software components (e.g., executed by a DSP or a general processor) and hardware components (e.g., logic gates and circuitry) within the processor(s) 1304 or the transceiver(s) 1310.

The CDRX module 1316 may be used for various aspects of the present disclosure, for example, aspects of FIG. 8 through FIG. 11. For example, the CDRX module 1316 may be configured to determine a current state of DL traffic being received at the UE and adaptively monitor for DCP(s) (or not) based on the current state of the traffic, as has been described herein.

The network device 1318 may include one or more processor(s) 1320. The processor(s) 1320 may execute instructions such that various operations of the network device 1318 are performed, as described herein. The processor(s) 1320 may include one or more baseband processors implemented using, for example, a CPU, a DSP, an ASIC, a controller, an FPGA device, another hardware device, a firmware device, or any combination thereof configured to perform the operations described herein.

The network device 1318 may include a memory 1322. The memory 1322 may be a non-transitory computer-readable storage medium that stores instructions 1324 (which may include, for example, the instructions being executed by the processor(s) 1320). The instructions 1324 may also be referred to as program code or a computer program. The memory 1322 may also store data used by, and results computed by, the processor(s) 1320.

The network device 1318 may include one or more transceiver(s) 1326 that may include RF transmitter and/or receiver circuitry that use the antenna(s) 1328 of the network device 1318 to facilitate signaling (e.g., the signaling 1334) to and/or from the network device 1318 with other devices (e.g., the wireless device 1302) according to corresponding RATs.

The network device 1318 may include one or more antenna(s) 1328 (e.g., one, two, four, or more). In embodiments having multiple antenna(s) 1328, the network device 1318 may perform MIMO, digital beamforming, analog beamforming, beam steering, etc., as has been described.

The network device 1318 may include one or more interface(s) 1330. The interface(s) 1330 may be used to provide input to or output from the network device 1318. For example, a network device 1318 that is a base station may include interface(s) 1330 made up of transmitters, receivers, and other circuitry (e.g., other than the transceiver(s) 1326/antenna(s) 1328 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1318 may include a CDRX module 1332. The CDRX module 1332 may be implemented via hardware, software, or combinations thereof. For example, the CDRX module 1332 may be implemented as a processor, circuit, and/or instructions 1324 stored in the memory 1322 and executed by the processor(s) 1320. In some examples, the CDRX module 1332 may be integrated within the processor(s) 1320 and/or the transceiver(s) 1326. For example, the CDRX module 1332 may be implemented by a combination of software components (e.g., executed by a DSP or a general processor) and hardware components (e.g., logic gates and circuitry) within the processor(s) 1320 or the transceiver(s) 1326.

The CDRX module 1332 may be used for various aspects of the present disclosure, for example, aspects of FIG. 2A through FIG. 6. For example, the CDRX module 1332 may be configured to make predictions of packet arrival(s) to a buffer of the RAN, indicate DCP(s) based on those predictions, and/or adjust PDCCH aggregation levels based on resource congestion, as has been described herein.

Embodiments contemplated herein include an apparatus comprising means to perform one or more elements of any of the method 1000 or the method 1100. This apparatus may be, for example, an apparatus of a UE (such as a wireless device 1302 that is a UE, as described herein).

Embodiments contemplated herein include one or more non-transitory computer-readable media comprising instructions to cause an electronic device, upon execution of the instructions by one or more processors of the electronic device, to perform one or more elements of any of the method 1000 or the method 1100. This non-transitory computer-readable media may be, for example, a memory of a UE (such as a memory 1306 of a wireless device 1302 that is a UE, as described herein).

Embodiments contemplated herein include an apparatus comprising logic, modules, or circuitry to perform one or more elements of any of the method 1000 or the method 1100. This apparatus may be, for example, an apparatus of a UE (such as a wireless device 1302 that is a UE, as described herein).

Embodiments contemplated herein include an apparatus comprising: one or more processors and one or more computer-readable media comprising instructions that, when executed by the one or more processors, cause the one or more processors to perform one or more elements of any of the method 1000 or the method 1100. This apparatus may be, for example, an apparatus of a UE (such as a wireless device 1302 that is a UE, as described herein).

Embodiments contemplated herein include a signal as described in or related to one or more elements of any of the method 1000 or the method 1100.

Embodiments contemplated herein include a computer program or computer program product comprising instructions, wherein execution of the program by a processor is to cause the processor to carry out one or more elements of any of the method 1000 or the method 1100. The processor may be a processor of a UE (such as a processor(s) 1304 of a wireless device 1302 that is a UE, as described herein). These instructions may be, for example, located in the processor and/or on a memory of the UE (such as a memory 1306 of a wireless device 1302 that is a UE, as described herein).

Embodiments contemplated herein include an apparatus comprising means to perform one or more elements of the method 600. This apparatus may be, for example, an apparatus of a base station of a RAN (such as a network device 1318 that is a base station, as described herein).

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, a memory of a base station of a RAN (such as a memory 1322 of a network device 1318 that is a base station, as described herein).

Embodiments contemplated herein include an apparatus comprising logic, modules, or circuitry to perform one or more elements of the method 600. This apparatus may be, for example, an apparatus of a base station of a RAN (such as a network device 1318 that is a base station, as described herein).

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a base station of a RAN (such as a network device 1318 that is a base station, as described herein).

Embodiments contemplated herein include a signal as described in or related to one or more elements of the method 600.

Embodiments contemplated herein include a computer program or computer program product comprising instructions, wherein execution of the program by a processing element is to cause the processing element to carry out one or more elements of the method 600. The processor may be a processor of a base station of a RAN (such as a processor(s) 1320 of a network device 1318 that is a base station, as described herein). These instructions may be, for example, located in the processor and/or on a memory of the base station of a RAN (such as a memory 1322 of a network device 1318 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus of a user equipment (UE), comprising:
one or more processors; and
a memory storing instructions that, when executed by the one or more processors, cause the one or more processors to operate the apparatus to:
monitor a state of periodic traffic that is received at the UE using a defined set of connected mode discontinuous reception (CDRX) on duration windows in order to identify when the state of the periodic traffic has transitioned to an active state during which a volume of the periodic traffic is relatively higher and when the state of the periodic traffic has transitioned to a silent state during which the volume of the periodic traffic is relatively lower;
after identifying that the state of the periodic traffic has transitioned to the silent state, perform downlink control information (DCI) with a cyclic redundancy check (CRC) scrambled by a power-saving radio network temporary identifier (PS-RNTI) (DCP) monitoring to identify ones of first CDRX on duration windows of the defined set of CDRX on duration windows that occur during the silent state during which to perform physical downlink control channel (PDCCH) monitoring; and
after identifying that the state of the periodic traffic has transitioned to the active state, skip the DCP monitoring and performing the PDCCH monitoring during each of second CDRX on duration windows of the defined set of CDRX on duration windows that occur during the active state.

2. The apparatus of claim 1, wherein the apparatus identifies that the state of the periodic traffic has transitioned to the silent state by determining that no PDCCH has been detected at the UE for a number of consecutive CDRX on duration windows of the defined set of CDRX on duration windows.

3. The apparatus of claim 1, wherein the apparatus identifies that the state of the periodic traffic has transitioned to the silent state by determining that a number of consecutive silence insertion description (SID) packets have been received at the UE.

4. The apparatus of claim 1, wherein the apparatus identifies that the state of the periodic traffic has transitioned to the active state by determining that the UE has received:
a number of consecutive DCPs indicating that PDCCH monitoring is to be performed during corresponding CDRX on duration windows of the defined set of CDRX on duration windows; and
a PDCCH during each of the corresponding CDRX on duration windows.

5. The apparatus of claim 1, wherein the apparatus identifies that the state of the periodic traffic has transitioned to the active state by determining that the UE has received a number of consecutive active voice packets.

6. A method of a user equipment (UE), comprising:
monitoring a state of periodic traffic that is received at the UE using a defined set of connected mode discontinuous reception (CDRX) on duration windows in order to identify when the state of the periodic traffic has transitioned to an active state during which a volume of the periodic traffic is relatively higher and when the state of the periodic traffic has transitioned to a silent state during which the volume of the periodic traffic is relatively lower;
after identifying that the state of the periodic traffic has transitioned to the silent state, performing downlink control information (DCI) with a cyclic redundancy check (CRC) scrambled by a power-saving radio network temporary identifier (PS-RNTI) (DCP) monitoring to identify ones of first CDRX on duration windows of the defined set of CDRX on duration windows that occur during the silent state during which to perform physical downlink control channel (PDCCH) monitoring; and
after identifying that the state of the periodic traffic has transitioned to the active state, skipping the DCP monitoring and performing the PDCCH monitoring during each of second CDRX on duration windows of the defined set of CDRX on duration windows that occur during the active state.

7. The method of claim 6, wherein the UE identifies that the state of the periodic traffic has transitioned to the silent state by determining that no PDCCH has been detected for a number of consecutive CDRX on duration windows of the defined set of CDRX on duration windows.

8. The method of claim 6, wherein the UE identifies that the state of the periodic traffic has transitioned to the silent state by determining that a number of consecutive silence insertion description (SID) packets have been received.

9. The method of claim 6, wherein the UE identifies that the state of the periodic traffic has transitioned to the active state by determining that it has received:
a number of consecutive DCPs indicating that PDCCH monitoring is to be performed during corresponding CDRX on duration windows of the defined set of CDRX on duration windows; and
a PDCCH during each of the corresponding CDRX on duration windows.

10. The method of claim 6, wherein the UE identifies that the state of the periodic traffic has transitioned to the active state by determining that it has received a number of consecutive active voice packets.

11. A non-transitory computer-readable storage medium including instructions that, when executed by a one or more processors of a user equipment (UE), cause the UE to:
monitor a state of periodic traffic that is received at the UE using a defined set of connected mode discontinuous reception (CDRX) on duration windows in order to identify when the state of the periodic traffic has transitioned to an active state during which a volume of the periodic traffic is relatively higher and when the state of the periodic traffic has transitioned to a silent state during which the volume of the periodic traffic is relatively lower;
after identifying that the state of the periodic traffic has transitioned to the silent state, perform downlink control information (DCI) with a cyclic redundancy check (CRC) scrambled by a power-saving radio network temporary identifier (PS-RNTI) (DCP) monitoring to identify ones of first CDRX on duration windows of the defined set of CDRX on duration windows that occur during the silent state during which to perform physical downlink control channel (PDCCH) monitoring; and after identifying that the state of the periodic traffic has transitioned to the active state, skip the DCP monitoring and performing the PDCCH monitoring during each of second CDRX on duration windows of the defined set of CDRX on duration windows that occur during the active state.

12. The non-transitory computer-readable storage medium of claim 11, wherein the UE identifies that the state of the periodic traffic has transitioned to the silent state by determining that no PDCCH has been detected at the UE for a number of consecutive CDRX on duration windows of the defined set of CDRX on duration windows.

13. The non-transitory computer-readable storage medium of claim 11, wherein the UE identifies that the state of the periodic traffic has transitioned to the silent state by determining that a number of consecutive silence insertion description (SID) packets have been received at the UE.

14. The non-transitory computer-readable storage medium of claim 11, wherein the UE identifies that the state of the periodic traffic has transitioned to the active state by determining that the UE has received:

a number of consecutive DCPs indicating that PDCCH monitoring is to be performed during corresponding CDRX on duration windows of the defined set of CDRX on duration windows; and a PDCCH during each of the corresponding CDRX on duration windows.

15. The non-transitory computer-readable storage medium of claim 11, wherein the UE identifies that the state of the periodic traffic has transitioned to the active state by determining that the UE has received a number of consecutive active voice packets.

* * * * *